United States Patent [19]
Reid

[11] Patent Number: 5,173,646
[45] Date of Patent: Dec. 22, 1992

[54] VACUUM CLEANER CONTROL CIRCUIT

[76] Inventor: William J. Reid, 7819 Pencross, Dallas, Tex. 75248

[21] Appl. No.: 584,098

[22] Filed: Sep. 18, 1990

[51] Int. Cl.⁵ .............................................. H02P 3/08
[52] U.S. Cl. .................................................... 318/245
[58] Field of Search ............... 318/293, 599, 811, 244, 318/245, 246, 247, 248, 249, 250, 251, 252; 388/811; 323/242, 244

[56] References Cited
U.S. PATENT DOCUMENTS

| | | | |
|---|---|---|---|
| 3,848,140 | 11/1974 | Guermeur et al. | 323/242 |
| 3,857,076 | 12/1974 | Hetland | 318/257 |
| 4,371,824 | 2/1983 | Gritter | 318/722 |
| 4,637,092 | 1/1982 | Hayashi et al. | 15/319 |

OTHER PUBLICATIONS

General Electric SCR Manual, 3d Ed. 1966, p. 54.

Primary Examiner—Steven L. Stephan
Assistant Examiner—Ben Davidson
Attorney, Agent, or Firm—John E. Vandigriff

[57] ABSTRACT

A transformerless control circuit turns the motor of a vacuum system ON/OFF using contact points at remote vacuum inlets, the contact points being electrically isolated from the 124/240 A.C. volt power line that supplies power to the vacuum system motor and the control circuit.

20 Claims, 2 Drawing Sheets

VACUUM CLEANER CONTROL CIRCUIT

FIELD OF THE INVENTION

This invention relates to vacuum cleaners, and more particularly to an electrical control circuit to replace transformers and relay devices used in remote powering of central vacuum systems.

BACKGROUND OF THE INVENTION

Building or central vacuum cleaner systems are known. These systems which are "built-in", i.e. fixed in a permanent position, have vacuum inlets which are connected by ducts to various parts of the building, providing vacuum through outlets in various parts of the building.

On/off switching of the vacuum cleaner power unit is controlled by completing and opening, respectively, an electrical connection at each vacuum outlet located throughout the building. Parallel electrical wires connect each vacuum outlet to the electrical control circuit that is part of the central vacuum cleaner power unit. Such switching at remote location, the location of each remote vacuum inlet, is described in U.S. Pat. No. 4,782,271 to Trowbridge.

The electrical switching control elements in vacuum cleaner power unit usually consists of a 24 VAC transformer and a single or multiple pole power relay.

When the electrical connection is completed at any of the vacuum inlets, or by an on/off switch located as part of the vacuum cleaner power unit, the alternating current from one leg of a 24 VAC transformer within the vacuum cleaner power unit flows through a relay energizing coil and completes connection through contacts at closed vacuum inlet switch to the other leg of the 24 VAC transformer. This alternating current flow energizes the relay coil closing the relay contacts and impressing 120/240 VAC from the power line voltage across one or more vacuum motors.

Therefore, before any means of electrical switch closure at the vacuum outlet, the voltage at the vacuum outlet is only 24 VAC, and the maximum current is limited by the relay coil resistance. This open circuit voltage of 24 VAC, provided by a class II approved transformer, has been certified safe by the Underwriter's Laboratory (UL) for direct human contact. The electrical connection points at the vacuum inlets are easily accessible to the touch of anyone operating the vacuum inlet, deliberately or accidentally, so safety is a primary requirement.

The weaknesses of prior art are the low reliability of high current relays, for motor control, and the unfavorable cost of relays and transformers compared to semiconductor devices.

SUMMARY OF THE INVENTION

The invention finds utility in built-in or central vacuum systems to provide on/off control at vacuum outlets, remote from the central vacuum power unit. The requirement is to provide remote switch closure connections points that are safe for direct human contact with the connection points. This invention provides on/off electrical control for vacuum motors that are powered directly from 120/240 VAC sources, with electrical contact points at the remote vacuum inlet that are isolated from the 120/240 VAC source voltage with the necessary safety to meet requirement of Underwriter Laboratories.

BRIEF DESCRIPTION OF THE DRAWINGS

The objects of the invention, as well as the technical advance represented thereby, will become apparent to those skilled in the art when taken in conjunction with the following listed drawings and the appended claims.

DESCRIPTION OF A PREFERRED EMBODIMENT

Figure 1:
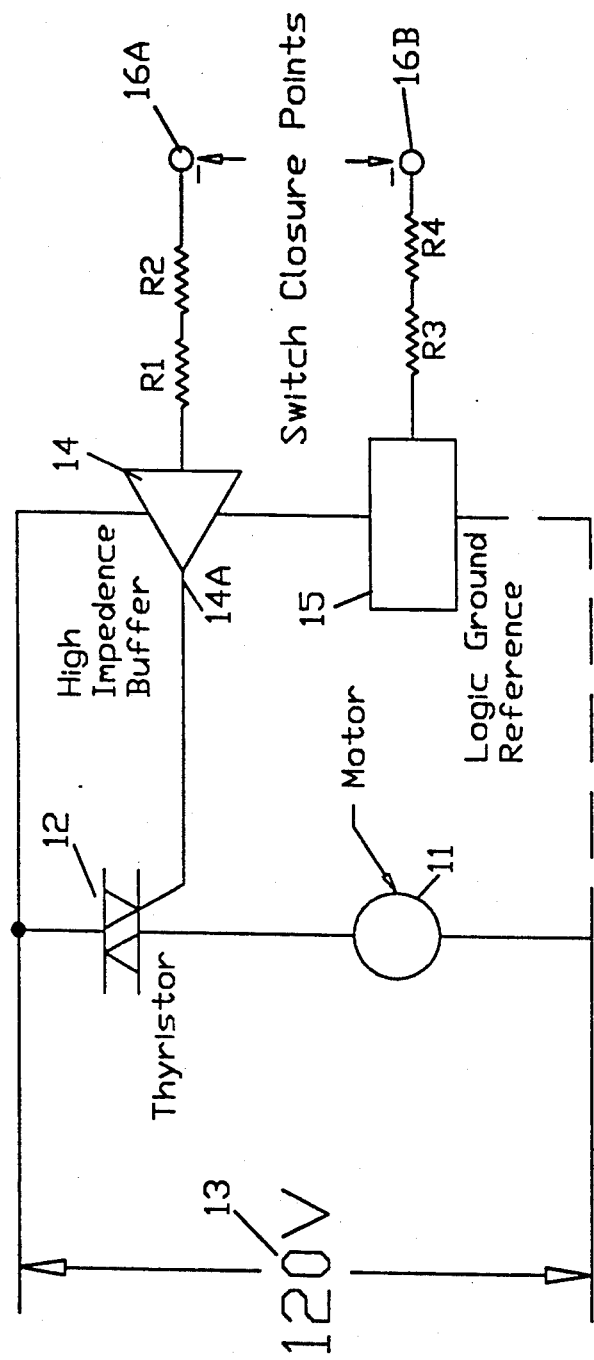
FIG. 1 illustrates a functional block diagram of the invention.

The basic concept of the invention is shown in block form in FIG. 1. Vacuum motor 11 is connected in series with a semiconductor thyristor 12 across a 120/240 VAC source 13 supply voltage. A buffer 14 provides the trigger drive to turn thyristor 12 on and off. The LOGIC GROUND REFERENCE circuit 15 provides negative power to provide on/off logic, and provides an isolated voltage that represents a logic "0" level. The "hot" side of the 120/240 VAC line voltage is used as positive power and represents a logic "1" level.

When SWITCH CLOSURE POINTS 16a and 16b are connected, a logic "0" is impressed on the BUFFER input 14a through resistors R1, R2, R3 and R4. BUFFER 14 enables THYRISTOR 12 when BUFFER input 14a is a logic "0". When SWITCH CLOSURE POINTS 16a and 16b are opened, BUFFER input 14a returns to a logic "1" level and THYRISTOR 12 is turned off. BUFFER 14 is a very high input impedance device, and resistors R1 and R2 are of very high values, and effectively isolate the BUFFER input 14a voltage level from SWITCH CLOSURE POINTS 16a and 16b, making this point safe for direct human contact. Resistors R2 and R4 are of similarly high value, and isolate the LOGIC GROUND REFERENCE voltage 15 from the SWITCH CLOSURE POINTS 16a and 16b.

Figure 2:
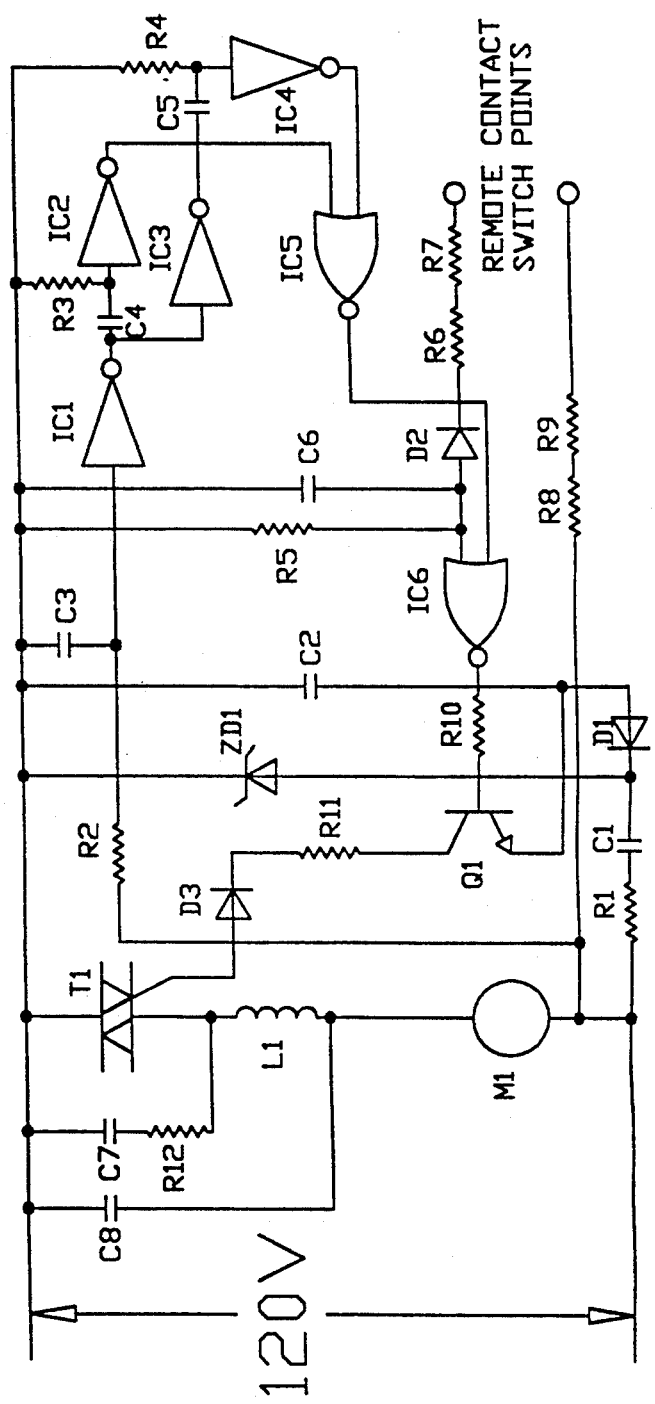
FIG. 2 is a detailed circuit diagram of a preferred embodiment of the invention.

FIG. 2 is a circuit diagram of a preferred embodiment of the present invention. Positive level logic power is provided by the hot side of the 120/240 VAC power line. Negative logic power and the logic "0" reference is obtained directly from the low side of the 120/240 VAC alternating line voltage by resistor R1, capacitor C1, zener diode ZD1, diode D1 and capacitor C2. Resistor R1 and capacitor C1 provide an impedance that limits current to the operating range of zener diode ZD1. Zener diode ZD1 provides at fixed reference voltage whenever the current in the zener diode ZD1 is above a specified value. In this circuit connection, zener diode ZD1 provides a reference voltage for most of the negative cycle of the alternating input voltage, and a zero voltage for most of the positive cycle of the alternating input voltage. Diode D1 and capacitor C2 provide a peak clamping and storage function, where the most negative voltage is stored by capacitor C2, thus providing a regulated voltage supply to the logic devices.

R2 and C3 provide a reduced level of the 60 Hz AC line voltage to IC1 that converts the 60 cycle Hz sine wave to a square wave 60 Hz logic signal. C4, R3, and IC2 form a 1 millisecond monostable flip-flop, triggered on the negative transition of the 60 Hz voltage wave form.

C5, R4 and IC4 form a 1 millisecond monostable flip-flop, triggered on the positive transition of the 60

Hz voltage wave form. IC5 combines the two monostable outputs of IC2 and IC4, and provides a 1 millisecond pulse synchronized with the zero voltage transitions of the 60 Hz line voltage. Completing the electrical connection at the REMOTE CONTACT SWITCH POINTS, provides a logic "0" through resistors R6, R7, R8 and R9 to IC6. IC6 is biased at logic "1" by R5. C6 provides filtering for the rectified input from D2. The very high impedance IC6 and high value resistors R6, R7, R8 and R9 provide the required isolation from the input voltage of the IC6 so that the REMOTE CONTACT SWITCH POINTS are safe for human contact, and meet the requirements of UL.

The output of IC6 enables Q1 through R10 to provide current pulses to Thyristor T1. R11 limits the power dissipated in Q1. D3 limits the positive excursion of the gate T1. The current pulses at the 60 Hz zero voltage crossing points trigger THYRISTOR T1 to a low resistance, high conductance state impressing the 120/240 VAC line voltage on one or more vacuum motors M1. By triggering THYRISTOR T1 only at the zero voltage points of the alternating voltage cycle, THYRISTOR T1 is subjected to minimal effects from inductive loads of motors, and requires minimum power in the triggering device.

Resistor R12 and capacitor C7 form a snubbing network to balance the inductive effects of motor M1. Inductor L1 and capacitor C8 provide a filter to limit electromagnetic radiation interference.

DC power for the control logic devices is referenced directly to the alternating line input voltage, i.e., there is no ground or earth reference to the logic circuit. The DC power positive values to the logic elements will be the hot side of the alternating line input voltage. The DC power negative value to the logic elements will be the alternating line input voltage less the reference voltage of zener diode ZD1. Because the control logic is powered directly from the 120/240 VAC line voltage, the control voltages accessible to the user at the vacuum outlet, must be adequately electrically isolated. This isolation is provided by high impedance gate IC6 and the large resistance elements R6, R7, R8 and R9.

What is claimed:

1. A solid state, transformerless on/off control circuit for vacuum systems, comprising:
   two terminals for connection to a 120/240 AC power source;
   terminals for supplying power to the vacuum system motor;
   a control device connected to one of said two terminals for connection to the power source for supplying A.C. line voltage to the vacuum motor and an isolation circuit;
   two switch closure points, which when closed cause power to be applied to said vacuum system motor; and
   the isolation circuit, including two monostable circuits, is connected to said control device to isolate the power source A.C. line voltage from said two switch closure points.

2. The control circuit according to claim 1, wherein said control device is a thyristor device.

3. The control circuit according to claim 1, wherein one side of the power source represents a logic "1", and including a logic ground reference circuit for defining a logic "0".

4. The control circuit according to claim 1, wherein one side of the power source represents a logic "0", and including a logic reference circuit for defining a logic "1".

5. The control circuit according to claim 1, wherein the isolation circuit includes a regulated power supply circuit.

6. The control circuit according to claim 2, wherein control timing of the thyristor is derived from the A.C. line voltage.

7. The control circuit according to claim 1, wherein the monostable circuits, in the isolation circuit, provides a pulse synchronized with the A.C. line voltage.

8. The control circuit according to claim 1, wherein the isolation circuit includes a high impedance integrated circuit that, in conjunction with high value resistors, isolates the A.C. line voltage from the switch closure points.

9. The control circuit according to claim 1, including a first circuit for providing a reduced level 60 Hz logic signal, a second circuit receiving the reduced level 60 Hz logic signal for providing a first logic signal triggered on the negative transition of the 60 Hz line voltage, a third circuit receiving the reduced level 60 Hz logic signal for providing a second logic signal triggered on the positive transition of the 60 Hz line voltage, and a fourth circuit for combining the first logic signal and the second logic signal to produce a pulse synchronized with the zero transition of the 60 Hz line voltage.

10. The control circuit according to claim 1, wherein the isolation circuit includes a switching circuit such that when the switch closure points are electrically connected, power is supplied to the vacuum system motor without causing the power line voltage being connected to the switch closure points.

11. A solid state, transformerless on/off control circuit for vacuum systems, comprising:
    first two terminals for connection to a 120/240 AC power source;
    second terminals for supplying power to the vacuum system motor;
    a control device connected to one of said first two terminals for connection to the power source for supplying A.C. line voltage to the vacuum motor and an isolation circuit;
    two switch closure points, which when closed cause power to be applied to said vacuum system motor at second terminals; and
    the isolation circuit, generating logic pulses, connected to said control device to isolate the power source A.C. line voltage from said two switch closure points, and to cause power to be applied to the vacuum system motor when the switch closure points are electrically connected to each other.

12. The control circuit according to claim 11, wherein said control device is a thyristor device.

13. The control circuit according to claim 11, wherein one side of the power source represents a logic "1", and including a logic ground reference circuit for defining a logic "0".

14. The control circuit according to claim 11, wherein one side of the power source represents a logic "0", and including a logic reference circuit for defining a logic "1".

15. The control circuit according to claim 11, wherein the isolation circuit includes a regulated power supply circuit.

16. The control circuit according to claim 12, wherein control timing of the thyristor is derived from the A.C. line voltage.

17. The control circuit according to claim 11, wherein the isolation circuit includes two monostable circuits to provide a pulse synchronized with the A.C. line voltage.

18. The control circuit according to claim 11, wherein the isolation circuit includes a high impedance integrated circuit that, in conjunction with high value resistors, isolates the A.C. line voltage from the switch closure points.

19. The control circuit according to claim 11, including a first circuit for providing a reduced level 60 Hz logic signal, a second circuit receiving the reduced level 60 Hz logic signal for providing a first logic signal triggered on the negative transition of the 60 Hz line voltage, a third circuit receiving the reduced level 60 Hz logic signal for providing a second logic signal triggered on the positive transition of the 60 Hz line voltage, and a fourth circuit for combining the first logic signal and the second logic signal to produce a pulse synchronized with the zero transition of the 60 Hz line voltage.

20. The control circuit according to claim 11, wherein the isolation circuit includes a switching circuit such that when the switch closure points are electrically connected, power is supplied to the vacuum system motor without causing the power line voltage being connected to the switch closure points.

* * * * *